United States Patent [19]

Sumpter

[11] 4,147,372
[45] Apr. 3, 1979

[54] DIRECTIONAL CONTROL COUPLING MECHANISM

[76] Inventor: Alray Sumpter, 936 W. 17th St., Port Arthur, Tex. 77640

[21] Appl. No.: 804,867

[22] Filed: Jun. 9, 1977

[51] Int. Cl.$^2$ ............................................. B62D 53/08
[52] U.S. Cl. ................................... 280/433; 280/467; 280/DIG. 9; 280/DIG. 14
[58] Field of Search .............. 280/462, 463, 467, 468, 280/DIG. 9, DIG. 14, 432, 433, 438; 172/386, 679, 742, 477, 447

[56] References Cited

U.S. PATENT DOCUMENTS

| | | | |
|---|---|---|---|
| 2,062,282 | 12/1936 | Acton | 280/474 |
| 2,605,114 | 7/1952 | Ronning | 280/474 |
| 2,890,896 | 6/1959 | Hendrickson | 280/464 |
| 3,036,845 | 5/1962 | Till | 280/432 |
| 3,353,841 | 11/1967 | Neal | 280/467 X |
| 3,680,890 | 8/1972 | Magown | 280/474 |

*Primary Examiner*—John A. Pekar

*Attorney, Agent, or Firm*—Baldwin, Egan, Walling & Fetzer

[57] ABSTRACT

A coupling mechanism adapted for attaching a draft vehicle to a drawn vehicle, so as to permit relative pivotal movement therebetween in a generally horizontal plane, and comprising an arcuate orientation of abutment means adapted to be supported by the draft vehicle and another abutment means adapted to be supported by the drawn vehicle, with at least one of the abutment means being selectively expandible or extendible by power means, for causing interlocking coaction between the first and second mentioned abutment means, so as to transmit force from the first mentioned abutment means to the second mentioned abutment means in a direction generally laterally of the longitudinal axis of the mechanism, whereby the drawn vehicle during a backing-up operation moves in the same general direction as the draft vehicle. The mechanism is useable with a fifth wheel type of truck-trailer combination as well as with trailer hitch drawn-bar type couplings for use in connection with automotive and truck-type vehicles.

14 Claims, 13 Drawing Figures

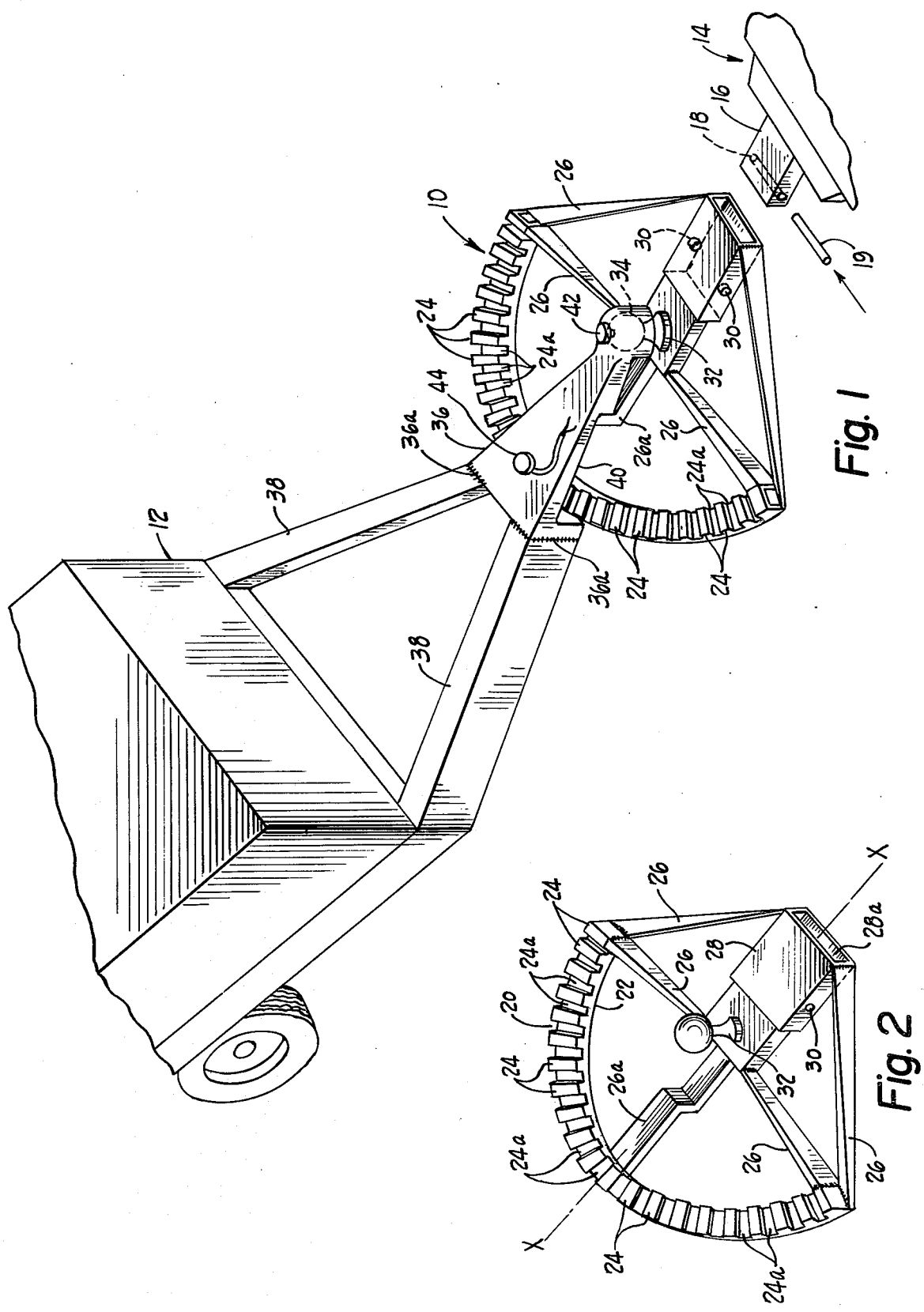

DIRECTIONAL CONTROL COUPLING MECHANISM

This invention relates in general to a coupling for attaching a draft vehicle to a drawn vehicle, and more particularly to a coupling which may be selectively actuated during the backing-up operation to move the drawn vehicle in the same general direction as the draft vehicle, to thus facilitate the backing-up operation.

BACKGROUND OF THE INVENTION

Many types of trailer hitching devices and draw bars and the like, are known in the prior art. However, during the backing-up operation as in the case of parking the trailer in a parking area, considerable problems often arise in connection with moving the drawn vehicle in the desired direction.

An example of prior art is shown for instance in U.S. Pat. No. 3,191,967 issued June 29, 1965 to C. J. Penk and entitled "Direction Control Trailer Hitch". However, such an arrangement necessitates considerable, relatively heavy parts, and is not entirely satisfactory. Other prior art patents relating to trailer coupling devices are shown for instance in U.S. Pat. No. 2,685,454 dated Aug. 3, 1954 and U.S. Pat. No. 3,556,558 dated Jan. 19, 1971.

SUMMARY OF THE INVENTION

The present invention provides a coupling mechanism adapted for attaching a draft vehicle to a drawn vehicle, with the coupling means comprising an arcuate orientation of abutment means adapted to be supported by the draft vehicle and another abutment means adapted to be supported by the drawn vehicle, with at least one of the abutment means being expandible or extendable by powered means, for causing interlocking coaction between the first and second abutment means, so as to transmit force from the first mentioned abutment means to the second mentioned abutment means in a direction laterally of the longitudinal axis of the coupling mechanism, so that during a backing-up operation the drawn vehicle tends to move in the same general direction as the draft vehicle, thereby facilitating the backing-up operation.

Accordingly, an object of the invention is to provide a novel coupling mechanism for attaching a draft vehicle to a drawn vehicle.

Another object of the invention is to provide a coupling mechanism for use between a draft vehicle and a drawn vehicle, which affords expeditious maneuverability in the desired direction of the drawn vehicle.

Another object of the invention is to provide a coupling mechanism of the above type which comprises an arcuate orientation of abutment means adapted to be supported by the draft vehicle and another abutment means adapted to be supported by the drawn vehicle, with at least one of the abutment means being extendable by power operated means, for causing interlocking coaction between the first and second mentioned abutment means, so as to provide for the transmission of force from the first mentioned abutment means to the second mentioned abutment means in a direction laterally of the longitudinal axis of said mechanism, whereby the drawn vehicle during a backing-up operation will tend to move in generally the same direction as the draft vehicle, thereby facilitating the backing-up operation.

Other objects and advantages of the invention will be apparent from the following description taken in conjunction with the accompanying drawings wherein:

BRIEF DESCRIPTION OF THE DRAWINGS

FIG. 1 is a broken, perspective illustration of a coupling means of the invention for use with a draw-bar type hitch device.

FIG. 2 is a perspective of the coupling means illustrated in FIG. 1, showing the arcuate orientation of one of the abutment means which is adapted for mounting on the draft vehicle along the longitudinal axis x—x.

DESCRIPTION OF PREFERRED EMBODIMENTS

Figure 3:
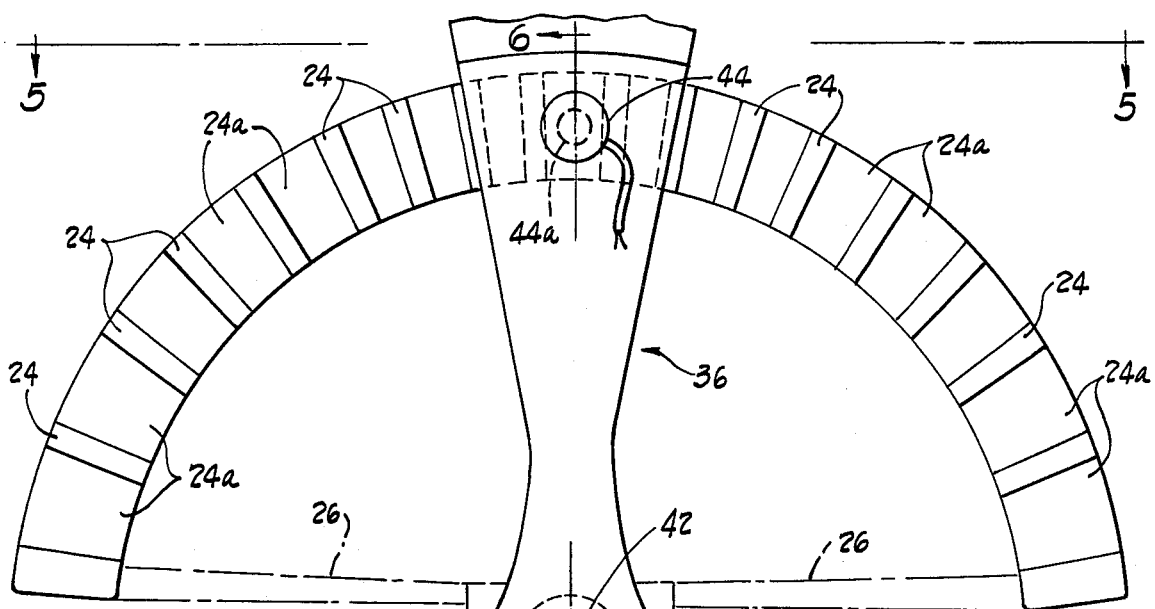
FIG. 3 is an enlarged, top plan view of the FIGS. 1 and 2 coupling means.
Figure 4:
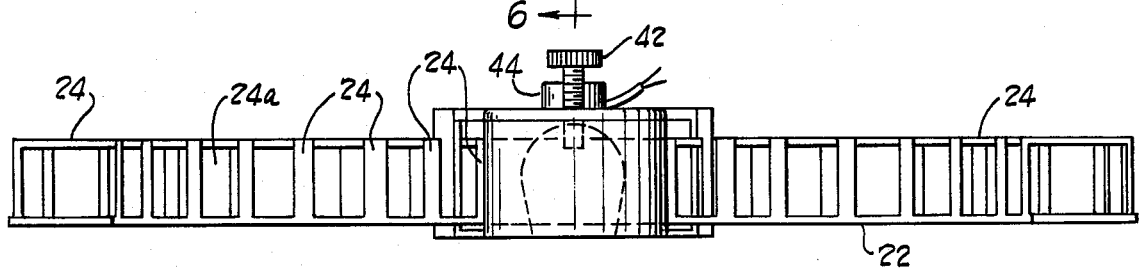
FIG. 4 is a front elevational view of the coupling means illustrated in FIG. 3.
Figure 5:
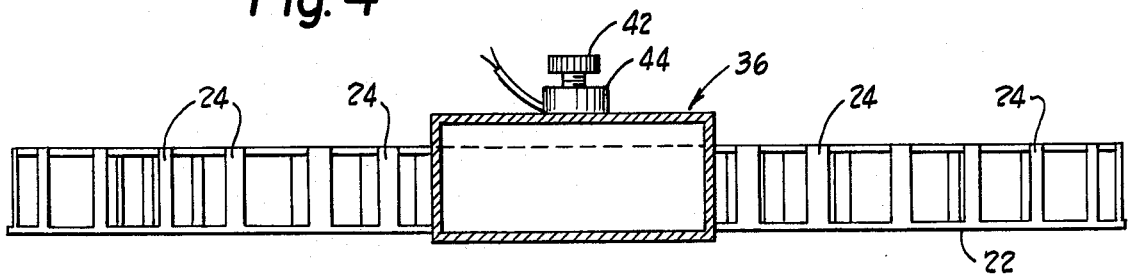
FIG. 5 is a rear view of the FIG. 3 coupling, taken generally along line 5—5 of FIG. 3, looking in the direction of the arrows.
Figure 6:
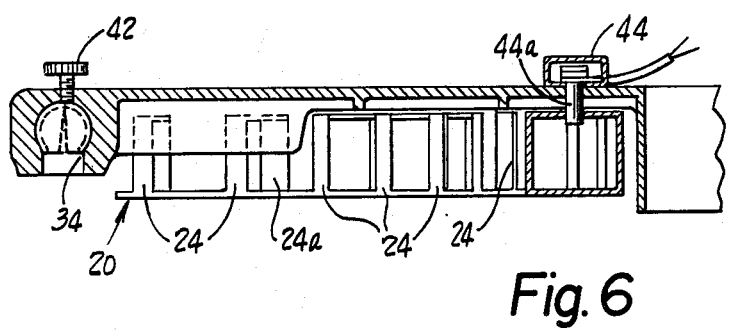
FIG. 6 is a reduced size, sectional view taken generally along the plane of line 6—6 of FIG. 3 looking in the direction of the arrows.
Figure 7:
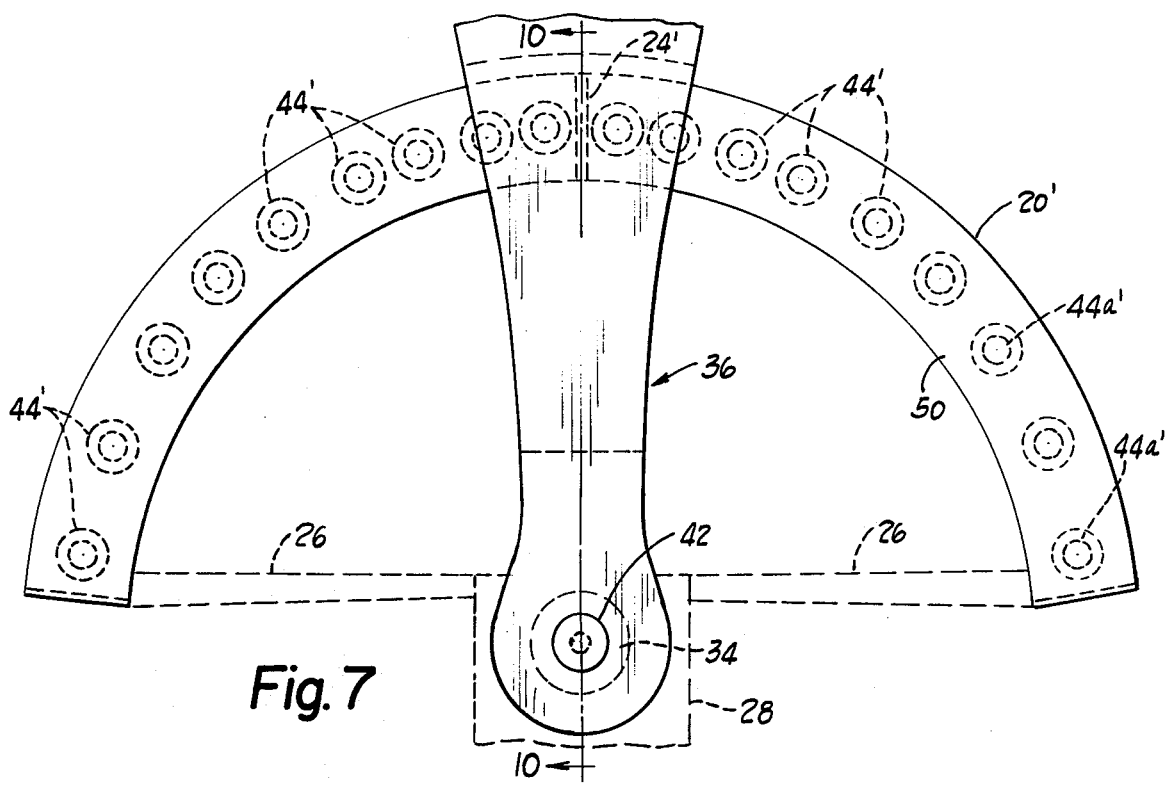
FIG. 7 is a top plan view of another embodiment of coupling.
Figure 8:
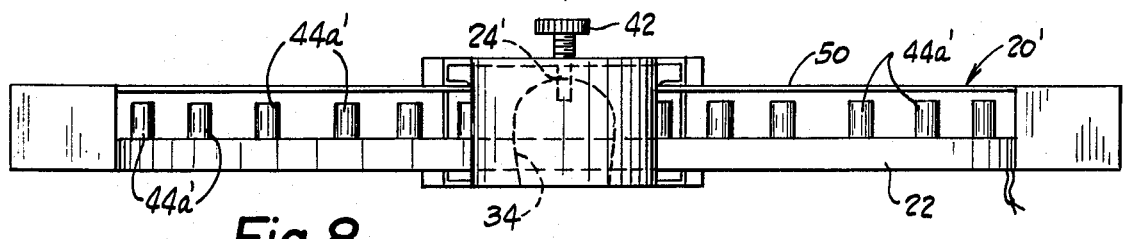
FIG. 8 is a front elevational view of the FIG. 7 embodiment.
Figure 9:
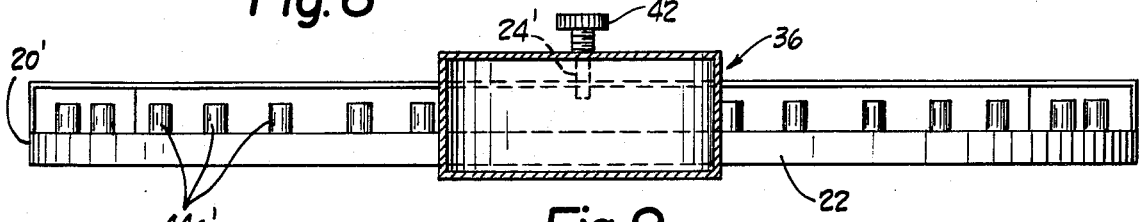
FIG. 9 is a rear elevation view of the FIG. 7 coupling, generally similar to that of FIG. 5.

Reference number 10 refers to the coupling means of the invention, and which is adapted to coact between, for instance, a drawn vehicle such as the wheeled trailer 12 and the draft vehicle 14, which may be for instance an automotive type vehicle. Draft vehicle 14 includes a male projection 16, extending from the rear thereof which includes a transverse opening 18 therethrough adapted to receive a coupling bolt or pin 19 for mounting the coupling means 10 on the draft vehicle, as will be hereinafter described in greater detail.

Coupling 10, comprises an arcuately oriented abutment means 20, which in the embodiment illustrated includes an arcuate shaped support base 22 having upwardly projecting abutment webs or projections 24 thereon, spaced laterally with respect to one another, to define spaces 24a between adjacent webs 24.

Arcuate portion 20 is rigidly connected as by means of struts 26, 26a to coupling bar portion 28. Coupling portion 28 includes female recess 28a therein, which is adapted to receive the aforementioned male projection 16 on the draft vehicle 14. Coupling portion 28 is provided with openings 30 in the side walls thereof, which openings are adapted for alignment with aforementioned opening 18 in male portion 16 on the draft vehicle, so that the coupling pin 19 can be inserted therethrough to couple the male projection 16 to the female coupling portion 28. It will be understood that while the male portion 16 when inserted into the female portion 28 and secured thereto by pin 19, does not have the ability of pivotal movement in a horizontal plane, it may have some slight relative movement in the vertical plane about the axis of pin 19.

Mounted on and secured to the coupling portion 28 is an upwardly projecting ball joint member 32, which is adapted to be received within the socket portion 34 of bridging section 36 of the coupling means, and which is attached, as by means of welds 36a, to the trailer frame 38.

In the embodiment illustrated, the bridging section 36 is recessed as at 40 and through which recess extends the arcuate portion 20, with the bridging section and attached trailer being adapted to pivot about the ball joint 32. A manual rotatable actuator 42 of conventional type coacts with the ball socket 34, and is externally accessible for actuation, to positively hold the ball joint 32 in the socket 34, while permitting relative movement therebetween.

In accordance with the invention, a power actuated abutment member 44 is mounted on bridging support section 36, and extends therethrough for receipt within an underlying one of the spaces 24a between adjacent teeth or webs 24. Abutment 44 in the embodiment illustrated, comprises a solenoid which when electrically actuated shifts the plunger 44a thereof downwardly to interlock the bridging section and trailer to the underlying abutment support 20, in whatever angled position the trailer is with respect to the draft vehicle and attached coupling abutment 20. Upon deenergization of the solenoid, a spring thereof moves the solenoid plunger 44a upwardly out of the space 24a between the respective abutment webs 24, thereby permitting unimpeded relative rotational movement between the bridging section 36 and attached trailer, and the coupling portion 20 and the attached draft vehicle.

A control button (not shown) can be located in the draft vehicle and coupled to the solenoid 44 by means of wire, for enabling actuation of the solenoid plunger from the draft vehicle. The electrical power for operating the solenoid may be taken from the vehicles electrical system.

Referring now to FIGS. 7 through 10, there is shown another embodiment of coupling which instead of having a power operated solenoid mounted on the bridging section, mounts a series of laterally spaced power operated solenoids on the support portion 20', and wherein selected pairs of which are actuatable for interlocking coaction with an abutment web mounted on the bridging section so as to interlock the bridging section and arcuate support portion of the coupling together in whatever angled position exists at the time of actuation of the respective pairs of solenoids. Accordingly, in this embodiment, there are plurality of laterally spaced solenoid members 44' mounted in arcuate orientation on the base plate 22 of the support 20'.

Figure 10:
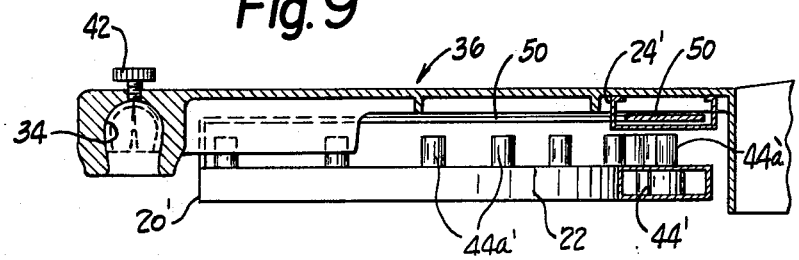
FIG. 10 is a reduced size sectional view taken generally along the plane of line 10—10 of FIG. 7 looking in the direction of the arrows.

The solenoids project upwardly from the base plate 22, with the plungers 44a' of a pair of the solenoids being adapted to project upwardly on opposite sides of a web abutment 24' which depends from the underside of the bridging section 36 (FIG. 10). Accordingly, the relative pivotal movement of the bridging section about the ball socket 32 is prevented and the bridging member is interlocked with the support coupling in whatever angled position exists at the time of actuation of the respective pair of solenoids 44'. A top abutment plate 50 is spaced upwardly from the support base 22, and limits the upward movement of the solenoid plungers. It will be seen that the plate 50 extends through the abutment web 24' on the bridging section 36 without interference.

Figure 11:
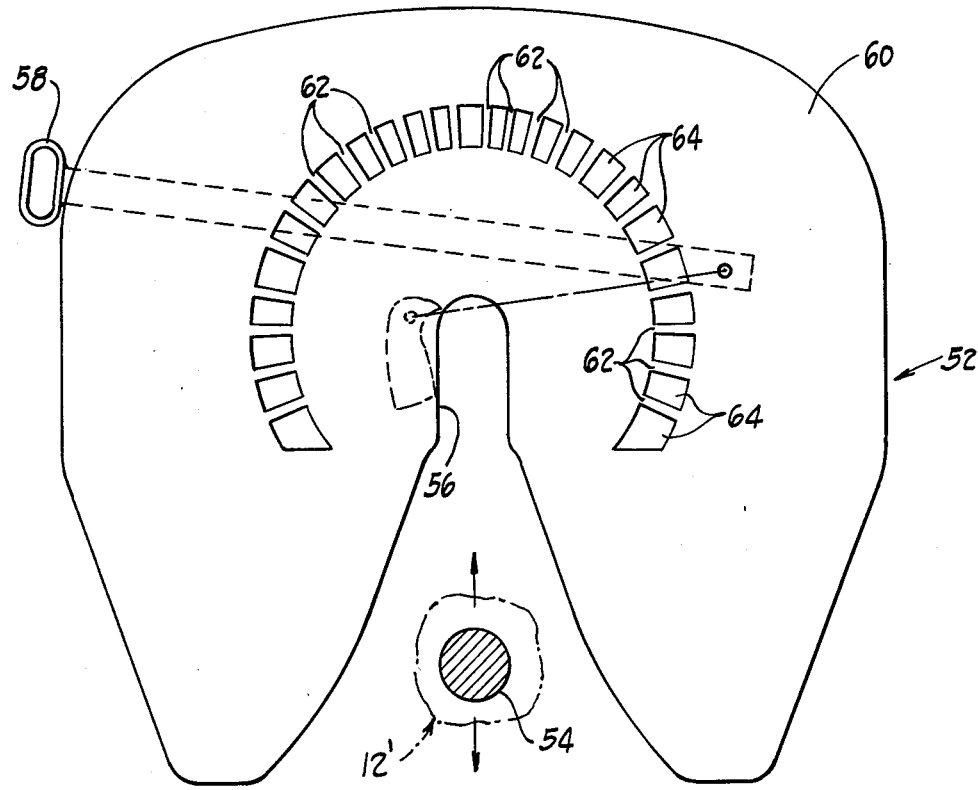
FIG. 11 is a top plan generally diagrammatic view of a fifth wheel embodiment of truck-trailer hitch, comprising the coupling means of the invention.
Figure 12:
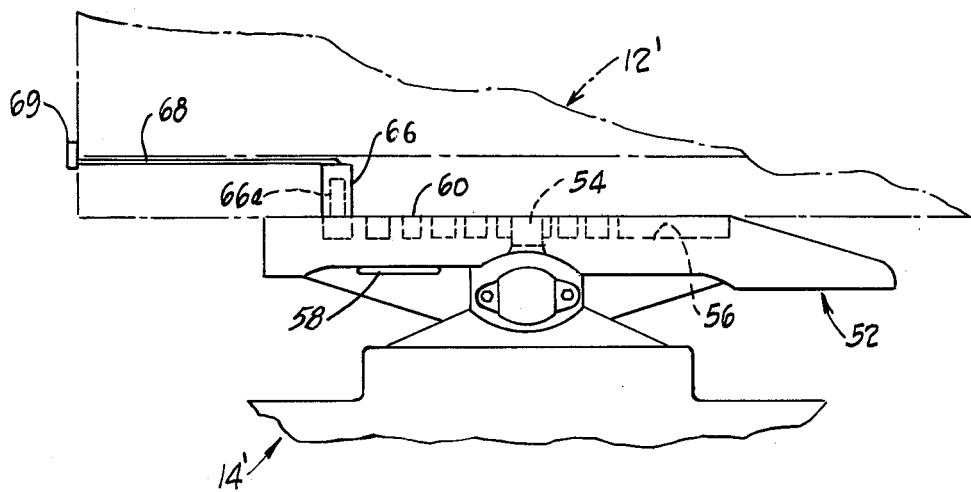
FIG. 12 is a generally diagrammatic, fragmentary, side elevational view of the FIG. 11 fifth wheel, and showing the drawn vehicle or truck-trailer mounted thereon.

Referring now to FIGS. 11 and 12, there is shown the coupling arrangement of the invention with a fifth wheel of the type utilized to couple a truck-trailer to a truck cab. The trailer king-pin 54 is diagrammatically illustrated, and is adapted to be received within the slot 56 in the fifth wheel plate, to be interlocked therewith by means of locking mechanism 58 of conventional type, and accessible for manual actuation by an operator.

In this embodiment, the top surface 60 of the fifth wheel support 52 on the draft vehicle is provided with a plurality of laterally spaced abutment webs 62 generally flush with the surface 60 and separated by spaces or recesses 64 formed in the surface of the plate 52. It will be seen that since the abutment webs 62 are flush with surface 60, that they create no interference whatsoever to angling movement of the drawn trailer 12' with respect to the fifth wheel plate 52 on the truck or draft vehicle.

Mounted on the drawn vehicle or trailer 12' in overlying relation to the recesses 64, is a power operated abutment member 66, such as the aforementioned solenoid, and which when actuated by a control button or switch located in the cab of the draft vehicle, causes the plunger 66a of the solenoid 66 to extend downwardly into the selected underlying recess 64 in the fifth wheel plate 52, to interlock the trailer body 12' to the fifth wheel structure 52 in whatever angled position exists between the drawn and the draft vehicle components. The solenoid may be spring returned and may be connected as by means of control wire 68 to a plug located on the exterior of the trailer body, for plugging into the control circuit including the aforementioned control button or switch located in the cab of the draft vehicles.

Figure 13:
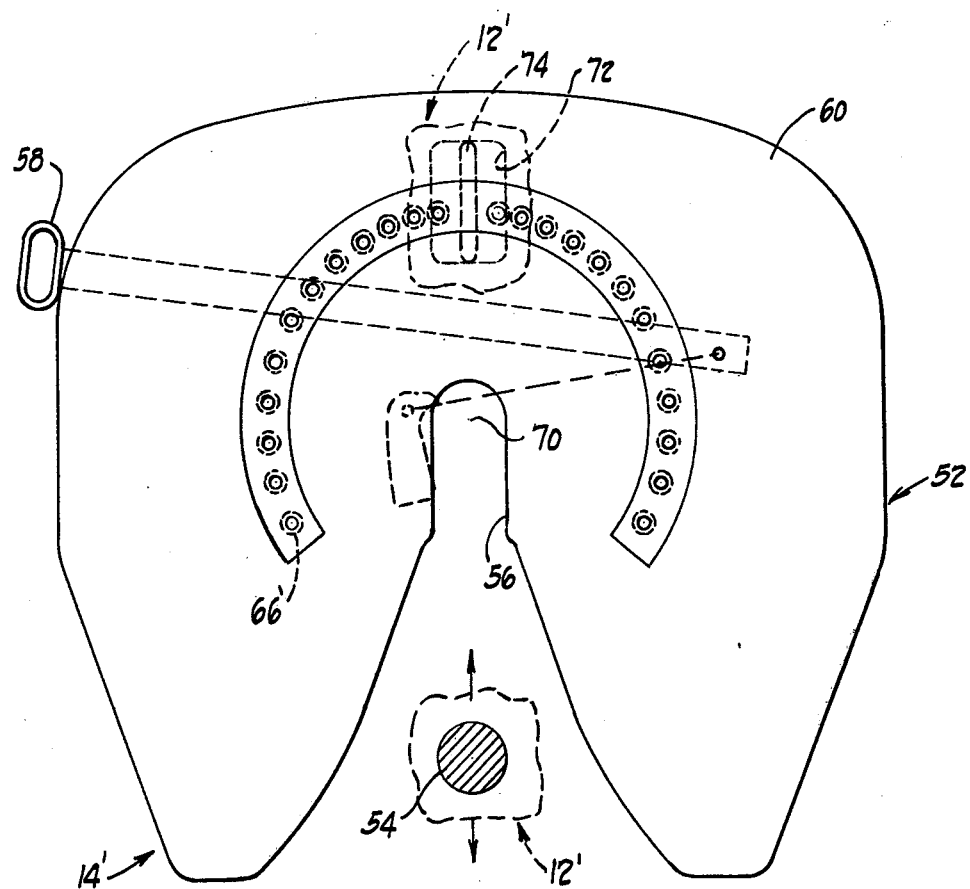
FIG. 13 is a generally diagrammatic top plan view of another embodiment of fifth wheel hitch, comprising the coupling means of the invention.

Referring now to FIG. 13, there is shown another embodiment of fifth wheel coupling structure, this embodiment being generally similar to that aforediscussed in connection with the FIGS. 7 to 10 embodiment, and wherein a seires of laterally spaced solenoids 66' are disposed in arcuate orientation about the center 70 of the axis of rotation of the trailer body 12' with respect to the fifth wheel plate 52, when the trailer king-pin 54 is moved into the slot 56 in the fifth wheel plate.

The trailer body 12' has a recess 72 in its underside, in which is disposed an abutment flange 74, so that when the abutment flange is disposed between a selected pair of the solenoids, the latter are actuated so that the plungers thereof project upwardly into the recess 72 and on opposite sides of the abutment flange 74 thus interlocking the trailer body with the fifth wheel plate 52 in whatever angled position of the trailer and fifth wheel in existance at that time. The solenoids can be flush with or below the top surface 60 of the fifth wheel plate 52, and therefore create no interference between the fifth wheel plate and the underside of the trailer vehicle during relative pivotal movement of the trailer portion 12'. However, in the active or actuated position of the selected pair of solenoids, the plungers thereof project upwardly above the top surface of the fifth wheel plate and enter into the cavity 72 on the underside of the trailer vehicle (when the cavity is disposed thereabove) and on opposite sides of the abutment web 74, to interlock the fifth wheel 52 to the trailer body 12'. The solenoid controls located in the draft vehicle are such that any selected pair of the solenoids can be actuated at will.

From the foregoing description and accompanying drawings it will be seen that the invention provides a novel coupling mechanism adapted for attaching a draft vehicle to a drawn vehicle, so as to permit relative pivotal movement therebetween in a general horizontal plane and comprising an arcuate orientation of abutment means adapted to be supported by the draft vehicle and another abutment means adapted to be supported by the drawn vehicle, with at least one of the abutment means being extendable by power means for causing interlocking coaction between the first and second mentioned abutment means, so as to transmit force from the first mentioned abutment means to the second mentioned abutment means in a direction generally laterally of the longitudinal axis of the mechanism, whereby the drawn vehicle during a back-up operation tends to move in a direction generally similar to the direction of the draft vehicle. The invention also provides a novel coupling mechanism adapted for use with the fifth wheel assembly attachment for a truck-trailer combination, and which is effective to expedite the backing-up of the trailer vehicle.

The terms and expressions which have been used, are used as terms of description, and not of limitation, and there is no intention in the use of such terms and expressions of excluding any equivalents of any of the features shown, or described, or portions thereof, and it is recognized that various modifications are possible within the scope of the invention claimed.

What is claimed is:

1. A coupling mechanism having a longitudinal axis and adapted for attaching a draft vehicle to a drawn vehicle, said mechanism being adapted for use in facilitating the backing up operation on the drawn vehicle and comprising a member having an arcuate orientation of generally laterally spaced abutment means extending to opposite sides of said axis and adapted to be supported by the draft vehicle and a support adapted to be secured to and supported by the drawn vehicle and mounting another abutment means in generally vertical relation to the first mentioned abutment means, pivot means coacting between said member and said support and coupling the latter together, said pivot means providing for pivotal movement of the first mentioned abutment means and the second mentioned abutment means in generally horizontal planes relative to one another, at least one of said abutment means being selectively extendable by power means for causing interlocking coaction between the first and second mentioned abutment means when so extended, in whatever positional relation the latter abutment means are disposed in at that instant, so as to transmit force from the first mentioned abutment means to said second mentioned abutment means in a direction laterally of the longitudinal axis of said mechanism, whereby the drawn vehicle during a backing up operation tends to move in the same general direction as the draft vehicle, said extendable abutment means normally being in retracted condition and when in said retracted condition being inoperative to cause interlocking coaction between said first and second mentioned abutment means.

2. A mechanism in accordance with claim 1 wherein said power actuated abutment means comprises an electrical solenoid.

3. A mechanism in accordance with claim 1 wherein said first abutment means comprises a series of generally laterally spaced generally vertically oriented webs, defining therebetween spaces into which said second mentioned abutment means is adapted to project upon said extension thereof, for causing interlocking coaction between the first and second abutment means.

4. A mechanism in accordance with claim 1 wherein the first mentioned abutment means comprises a series of generally laterally spaced solenoids oriented into a generally arcuate orientation, and the second mentioned abutment means comprises a generally rigid web which is adapted to be received between a pair of adjacent solenoids upon extension of the latter mentioned pair, for causing abutting coaction between the first and second mentioned abutment means.

5. A coupling mechanism having a longitudinal axis and adapted for attaching a draft vehicle to a drawn vehicle, said mechanism being adapted for use in facilitating the backing up operation on the drawn vehicle and comprising an arcuate orientation of generally laterally spaced abutment means extending to opposite sides of said axis and adapted to be supported by the draft vehicle and a support adapted to be secured to and supported by the drawn vehicle and mounting another abutment means, the first mentioned abutment means and the second mentioned abutment means being pivotal in a generally horizontal plane relative to one another, at least one of said abutment means being selectively extendable by power means for causing interlocking coaction between the first and second mentioned abutment means in whatever positional relation the latter abutment means are disposed in at that instant, so as to transmit force from the first mentioned abutment means to said second mentioned abutment means in a direction laterally of the longitudinal axis of said mechanism, whereby the drawn vehicle during a backing up operation tends to move in the same direction as the draft vehicle, said extendable abutment means normally being in retracted condition and when in said retracted condition being inoperative to cause interlocking coaction between said first and second mentioned abutment means, and wherein said first mentioned abutment means comprises an arcuate shaped support portion and a coupling portion and strut means generally rigidly connecting said arcuate portion to said coupling portion, said support mounting said second mentioned abutment means comprising a bridging portion overlying said arcuate portion and adapted for connection to the drawn vehicle, and means on said bridging portion and on said coupling portion providing for pivotal movement of said bridging portion relative to said arcuate portion and attached coupling portion in a generally horizontal plane, said extendable abutment means including a solenoid having a movable plunger, and said coupling portion including a female recess adapted to receive a male projection securable to the draft vehicle for coupling the mechanism to the draft vehicle.

6. A mechanism in accordance with claim 5 wherein said male projection and female recess provide for limited movement of the male projection with respect to the female recess in a vertical plane but prevent pivotal movement of the male projection and female recess relative to one another in a horizontal plane.

7. A mechanism in accordance with claim 5 wherein the concave side of said arcuate support portion faces in the direction of said coupling portion and the convex side faces in the direction away from said coupling portion, said pivotal means on said bridging portion and on said coupling portion comprising a ball and socket connection providing for generally universal movement of said bridging portion relative to said coupling portion in the retracted condition of said solenoid plunger.

8. A mechanism in accordance with claim 7 wherein said bridging portion is recessed on its underside and said arcuate support portion is received through said recess for pivotal movement of said bridging portion relative to said arcuate support portion during towing of the drawn vehicle by the draft vehicle.

9. A mechanism in accordance with claim 5 wherein said solenoid is mounted on said bridging portion, said arcuate portion including a plurality of upstanding laterally spaced webs disposed below said solenoid, said plunger of said solenoid upon energization of the latter being adapted to project between the underlying pair of said webs on said support portion for interlocking said first and second abutment means.

10. A mechanism in accordance with claim 5 wherein said arcuate support portion includes an overlying abutment plate, said extendable abutment means including a plurality of laterally spaced solenoids each of which comprises a movable plunger, said solenoids being mounted on said support portion beneath said plate, said other abutment means comprising a U-shaped in side elevation web disposed on said bridging portion and depending therefrom, said plate passing through said web for movement of said bridging portion relative to said support portion and attached plate, and said web being adapted to be received between and interlocked with the plungers of a pair of adjacent solenoids in the energized condition of the latter, to interlock said first and second mentioned abutment means.

11. A coupling mechanism having a longitudinal axis and adapted for attaching a draft vehicle to a drawn vehicle, said mechanism being adapted for use in facilitating the backing up operation on the drawn vehicle and comprising a member having an arcuate orientation of generally laterally spaced abutment means extending to opposite sides of said axis and adapted to be supported by the draft vehicle and a support adapted to be secured to and supported by the drawn vehicle and mounting another abutment means, the first mentioned abutment means and the second mentioned abutment means being pivotal in a generally horizontal plane relative to one another, at least one of said abutment means being selectively extendable by power means for causing interlocking coaction when so extended between the first and second mentioned abutment means in whatever positional relation the latter abutment means are disposed in at that instant, so as to transmit force from the first mentioned abutment means to said second mentioned abutment means in a direction laterally of the longitudinal axis of said mechanism whereby the drawn vehicle during a backing up operation tends to move in the same general direction as the draft vehicle, said extendable abutment means normally being in retracted condition and when in said retracted condition being inoperative to cause interlocking coaction between said first and second mentioned abutment means, said member comprising a fifth wheel plate having a slot therein and said support including a king-pin receivable in relatively movable relation in said slot, providing for relative pivotal movement of the drawn vehicle and the draft vehicle, said first mentioned abutment means being disposed on said fifth wheel plate, and means for selectively locking the king-pin in pivotal relation to the slot in the fifth wheel plate.

12. A mechanism in accordance with claim 11 wherein said extendable abutment means is adapted for mounting on the drawn vehicle, said first mentioned abutment means comprising a series of laterally spaced webs formed in the top surface of said fifth wheel plate and defining therebetween spaces in said top surface into which said extendable abutment means is adapted to project for causing interlocking coaction between said first and second abutment means.

13. A mechanism in accordance with claim 11 wherein said extendable abutment means is adapted for mounting on the draft vehicle and comprises a series of laterally spaced solenoids, each of which includes a movable plunger, said solenoids being disposed below or flush with the top surface of said fifth wheel plate, said second mentioned abutment means comprising a web disposed in a recess adapted for disposal on the drawn vehicle, and in overlying relation to the arcuate orientation of said solenoids, the plungers of a selected pair of adjacent solenoids upon energization of the latter being receivable in said recess on opposite sides of said web to interlock said first and second mentioned abutment means.

14. A mechanism in accordance with claim 11 wherein said extendable abutment means comprises an electrical solenoid including a movable plunger, and means for energizing said solenoid to extend the plunger thereof, and the other abutment means comprises a web adapted for interlocking coaction with the plunger of said solenoid in the energized condition of the latter, to cause interlocking coaction between the first and second mentioned abutment means.

* * * * *